(No Model.) 2 Sheets—Sheet 1.

A. M. GAYNOR.
CHECK ROW MECHANISM FOR CORN PLANTERS.

No. 583,645. Patented June 1, 1897.

Witnesses;
F. W. Woerner,
L. A. Minturn

Inventor,
Abraham M. Gaynor,
By Joseph A. Minturn,
Attorney,

THE NORRIS PETERS CO., PHOTO-LITHO., WASHINGTON, D. C.

(No Model.) 2 Sheets—Sheet 2.

A. M. GAYNOR.
CHECK ROW MECHANISM FOR CORN PLANTERS.

No. 583,645. Patented June 1, 1897.

Witnesses;
F. W. Woerner,
L. A. Minturn

Inventor,
Abraham M. Gaynor,
By Joseph A. Minturn,
Attorney.

UNITED STATES PATENT OFFICE.

ABRAHAM M. GAYNOR, OF INDIANAPOLIS, INDIANA, ASSIGNOR TO ANDREW HERMANNY, EDWARD HARMON, AND JOHN J. GAYNOR, OF SAME PLACE.

CHECK-ROW MECHANISM FOR CORN-PLANTERS.

SPECIFICATION forming part of Letters Patent No. 583,645, dated June 1, 1897.

Application filed January 25, 1897. Serial No. 620,558. (No model.)

*To all whom it may concern:*

Be it known that I, ABRAHAM M. GAYNOR, a citizen of the United States, residing at Indianapolis, in the county of Marion and the State of Indiana, have invented certain new and useful Improvements in Check-Row Mechanism for Corn-Planters; and I do hereby declare the following to be a full, clear, and exact description of the invention, such as will enable others skilled in the art to which it appertains to make and use the same.

This invention relates to improvements in means for dropping corn in check-rows without the use of a check-line, and has for its object the construction of a device whereby the dropping mechanism will be driven from a traction-wheel, and whereby the uneven surface of the ground will not cause the traction-wheel to slip back nor to move unduly forward to throw the hills of corn out of lateral alinement across the field, which has been the cause of failure heretofore in attempts made to drive the dropping mechanism from a traction-wheel.

The object also is to provide means for marking the hills, whereby the driver can tell at a glance when the planter is dropping out of line, and also to provide means whereby the dropping mechanism can be brought into proper relation with the traction-wheel to correct any errors in the dropping.

I accomplish the objects of the invention by the mechanism illustrated in the accompanying drawings, in which—

Figure 1:
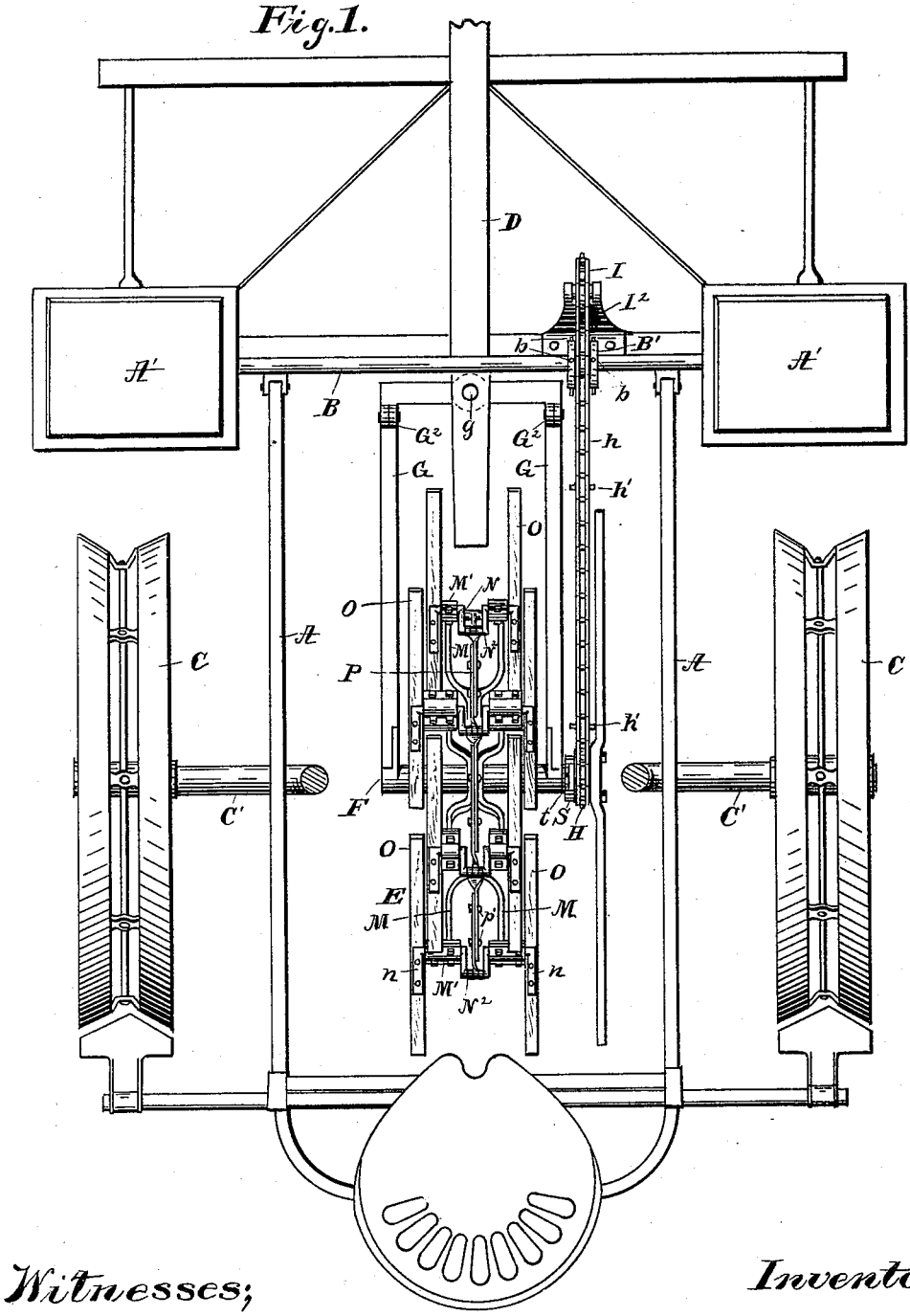
Figure 2:
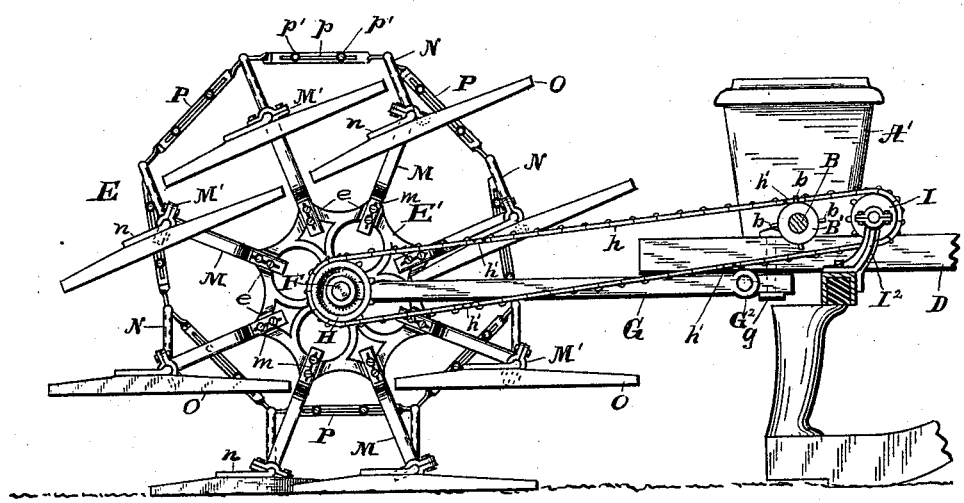
Figure 3:
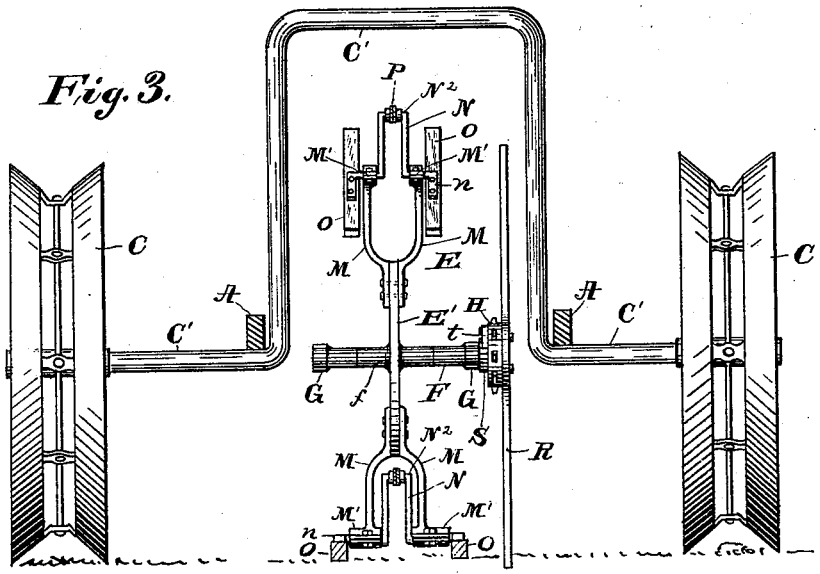
Figure 4:
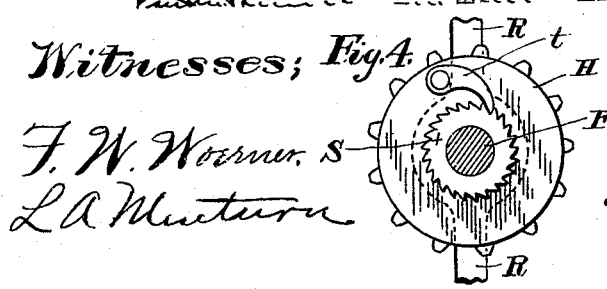

Figure 1 is a top or plan view of a corn-planter with my improvement, the upwardly-cranked part of the arched axle being removed to show the underlying parts; Fig. 2, a detail in side elevation of a planter, showing my traction-wheel connected up with the rotary dropper-shaft of the planter; Fig. 3, a detail in rear elevation, partially in section, of a planter with my improvement; and Fig. 4, a detail showing the ratchet-wheel and pawl by which the driving sprocket-wheel is adjustably secured to the shaft on which the traction-wheel is mounted.

Similar letters of reference indicate like parts throughout the several views of the drawings.

A represents the frame of a corn-planter, A' the seed-boxes, B the rotating dropper-shaft, C the wheels, and D the tongue, of the planter, all of well-known and usual construction.

C' is the axle, on which the wheels C are mounted. It is cranked up approximately in the middle, as shown in Fig. 3, to make room for my improved traction-wheel. E represents this traction-wheel, which is mounted on the short shaft F and turns with the shaft. The shaft F is journaled to the ends of the arms G of a yoke, and the cross-bar of the yoke is pivotally secured to the tongue C by means of the pin $g$, whereby a lateral adjustment of the yoke and its traction-wheel is provided. Knuckle-joints $G^2$ in the arms G allow for the vertical adjustment of the traction-wheel in passing over uneven surfaces. The shaft F has the ratchet-wheel S mounted thereon and turning with the shaft. It also has the sprocket-wheel H, which is loosely mounted on the shaft close against the outer side of the ratchet-wheel S. A pawl $t$ is pivotally secured to the wheel H and engages the teeth of the wheel S, whereby when the shaft F turns by the forward movement of the traction-wheel E across the field the sprocket-wheel H will be rotated, but by means of the pawl and ratchet the sprocket-wheel H can be turned back without moving the traction-wheel and the shaft on which the traction-wheel is mounted. Fastened to the sprocket-wheel H is the rod R, which is long enough to extend into the ground at each revolution of the sprocket-wheel and leave a mark by which the driver of the machine can know when the corn is being dropped in rows properly.

$I^2$ is a bracket secured to the front frame of the planter and supports the sprocket-wheel I. A sprocket-chain $h$ connects the wheel H with the wheel I and passes over the wheel B' on the dropper-shaft B. The wheel B' has the radial pins $b$, preferably in pairs, one on each side of the chain belt. The belt $h$ has the integral lateral lugs $h'$, which engage the pins on the wheel B' and turn the wheel and its shaft part of a revolution, which drops the corn in the seedboxes A' in the usual way. The chain belt does not contact with the pins on the wheel B' on its return to the wheel H. The number and distance apart of the lateral lugs $h'$ on the chain and of the pins $b$ on the wheel B′ will determine the number of hills which will be dropped at each revolution of the traction-wheel E.

In turning the machine around at the ends of the rows and, perhaps, at other times the order of dropping may not correspond with the dropping already done, and it is to facilitate the correction of this error without moving the traction-wheel that the sprocket-wheel H is provided with the pawl-and-ratchet connection with its shaft, which enables the wheel H and its marker to be turned back until the marker is brought into register.

I will now describe the essential feature of my invention, which is the traction-wheel E.

E′ is a metal spider with a hub $f$ sufficiently long to give the requisite stability on the shaft F, and M are equidistant two-part radial arms. I have here shown a wheel with eight arms, but the number may be more or less without departing from the spirit of this invention. The two parts which constitute each of the arms are bolted on opposite sides of the spider between the parallel ribs $e$, which assist in holding the arms immovably in position. Longitudinal bolt-slots $m$ permit of the longitudinal adjustment of the arms. Each part of the two-part arms terminates with the journal-boxes M′, in which the cranked shafts N are mounted, and the two parts of the arms are sufficiently separated to allow the cranked portion of the shafts N to swing between the said parts without conflict therewith, as shown in Fig. 3. Each alternate shaft is longer than the preceding or following one in order that the foot-bars O, which are long enough to lap each other, will not conflict, and the journal-boxes to support the shafts are made in proportionate lengths. The ends of the shafts N, outside of their journal-boxes, are bent at right angles to the cranked parts of the shafts to form the parts $n$, and to these parts $n$ the bars O, made out of wood or metal, will be fastened. These bars O, I will designate as "foot-bars," because they form the feet on which the traction-wheel moves forward.

The horizontal cross-bars $N^2$ of the cranks are connected up with each other by the bars P. The bars P are of equal length throughout the entire series and are connected with the cranks in a manner to permit of free action at the joints. The bars will preferably be made in two parts, which lap and are held together by means of bolts $p'$, projected through longitudinal slots $p$. The slots allow for the longitudinal adjustment of the bars in length. This adjustment of the length of the bars P, taken in connection with the longitudinal adjustment of the radial arms M, provides means whereby the diameter of the traction-wheel E can be varied to increase or decrease the distance of the hills apart without changing the lugs on the chain belt $h$ or the pins on the wheel B′.

The bars P serve to maintain the cranks constantly above the foot-bars in all positions of the traction-wheel, whereby said bars will always be in right position for use as they are brought successively into play by the forward movement of the wheel and will be set down upon and lifted from the ground without any longitudinal or sliding movement. The foot-bars are long enough to reach across any holes that would be encountered, and by the construction here shown two of the bars (the pair attached to the same crank) will always be on the ground, while part of the time there will be four foot-bars on the ground at once, as shown in Fig. 2, and every succeeding pair of bars will be firmly in position on the ground before the preceding pair is moved.

Having thus fully described my invention, what I claim as new, and wish to secure by Letters Patent of the United States, is—

1. In a traction-wheel for actuating the dropping mechanism of a corn-planter, a plurality of foot-bars each of which are suspended from and work on double pivots in the manner substantially as shown whereby the said bars will adjust themselves approximately to a horizontal position previous to being brought into contact with the ground by the revolution of the wheel and maintained horizontally until after leaving the ground, as and for the purposes specified.

2. In a traction-wheel for corn-planters, the combination of the spider E′, arms M, cranked shafts N journaled on the ends of the arms M, bars P connecting the cranks as shown, and the foot-bars O, all substantially as described and specified.

3. In a corn-planter, the combination with a traction-wheel having foot-bars which adjust themselves approximately to a horizontal position previous to being brought into contact with the ground and maintained horizontally until after leaving the ground, of the rotating dropper-shaft B, wheel B′ having projections $b$, and sprocket-belt $h$ driven from the traction-wheel and passing over the wheel B′ and having lateral projections to engage the projections $b$ on the wheel B′, all substantially as described and for the purposes specified.

4. The combination with a corn-planter of the traction-wheel E as described mounted rigidly on the shaft F, a sprocket-wheel H connected by the belt $h$ with the rotating dropper-shaft B, and having the marker R secured thereto, said sprocket-wheel being loosely mounted on the shaft F, and a ratchet-wheel and pawl substantially as described for actuating the sprocket-wheel from the shaft on which it is mounted.

In testimony whereof I affix my signature in presence of two witnesses.

ABRAHAM M. GAYNOR.

Witnesses:
JOSEPH A. MINTURN,
JOHN J. GAYNOR.